United States Patent [19]

Steinbichler et al.

[11] Patent Number: 5,141,682
[45] Date of Patent: Aug. 25, 1992

[54] INJECTION MOLDING PROCESS WITH PRESSURE INCREASING MECHANISM

[75] Inventors: Georg Steinbichler, Rottenmann; Alfred Lampl, Schwertberg, both of Austria

[73] Assignees: Engel Maschinebau Gesellschaft m.b.H., Schwertberg, Austria; Hydac Technology GmbH, Sulzbach/Saar, Fed. Rep. of Germany

[21] Appl. No.: 640,187

[22] Filed: Jan. 11, 1991

Related U.S. Application Data

[63] Continuation-in-part of Ser. No. 409,241, Sep. 19, 1989, abandoned.

[30] Foreign Application Priority Data

Sep. 26, 1988 [AT] Austria .................................... 2369/88

[51] Int. Cl.$^5$ ........................ B29C 45/00; B29D 22/00
[52] U.S. Cl. .............................. 264/40.300; 264/328.8; 264/328.12; 264/328.13; 264/572
[58] Field of Search ................. 264/37, 40.3, 40.5, 264/85, 328.8, 328.12, 328.13, 500, 572; 425/135, 150, 217, 542, 546, 557, 558, 559, 560, 812

[56] References Cited

U.S. PATENT DOCUMENTS

| | | | |
|---|---|---|---|
| 3,825,386 | 7/1974 | Bello et al. | 425/150 |
| 4,126,657 | 11/1978 | Gado | 264/85 |
| 4,394,333 | 7/1983 | Fukushima et al. | 264/37 |

FOREIGN PATENT DOCUMENTS 2139548 11/1984 United Kingdom .

*Primary Examiner*—Leo B. Tentoni
*Attorney, Agent, or Firm*—Notaro & Michalos

[57] ABSTRACT

A method for supplying a selected quantity of gas to the mold of an injection molding machine utilizes two high pressure gas bottles which are connected through a pressure reducing valve to a piston reservoir for receiving a quality of the gas. The piston reservoir is hydraulically powered to supply the gas to a further piston reservoir having a smaller volume which is connected through a valve to the mold. The second piston reservoir is also hydraulically powered for supplying a selected quality of gas under a variable pressure to the mold. Gas from the mold is recycled to both reservoirs in steps.

8 Claims, 1 Drawing Sheet

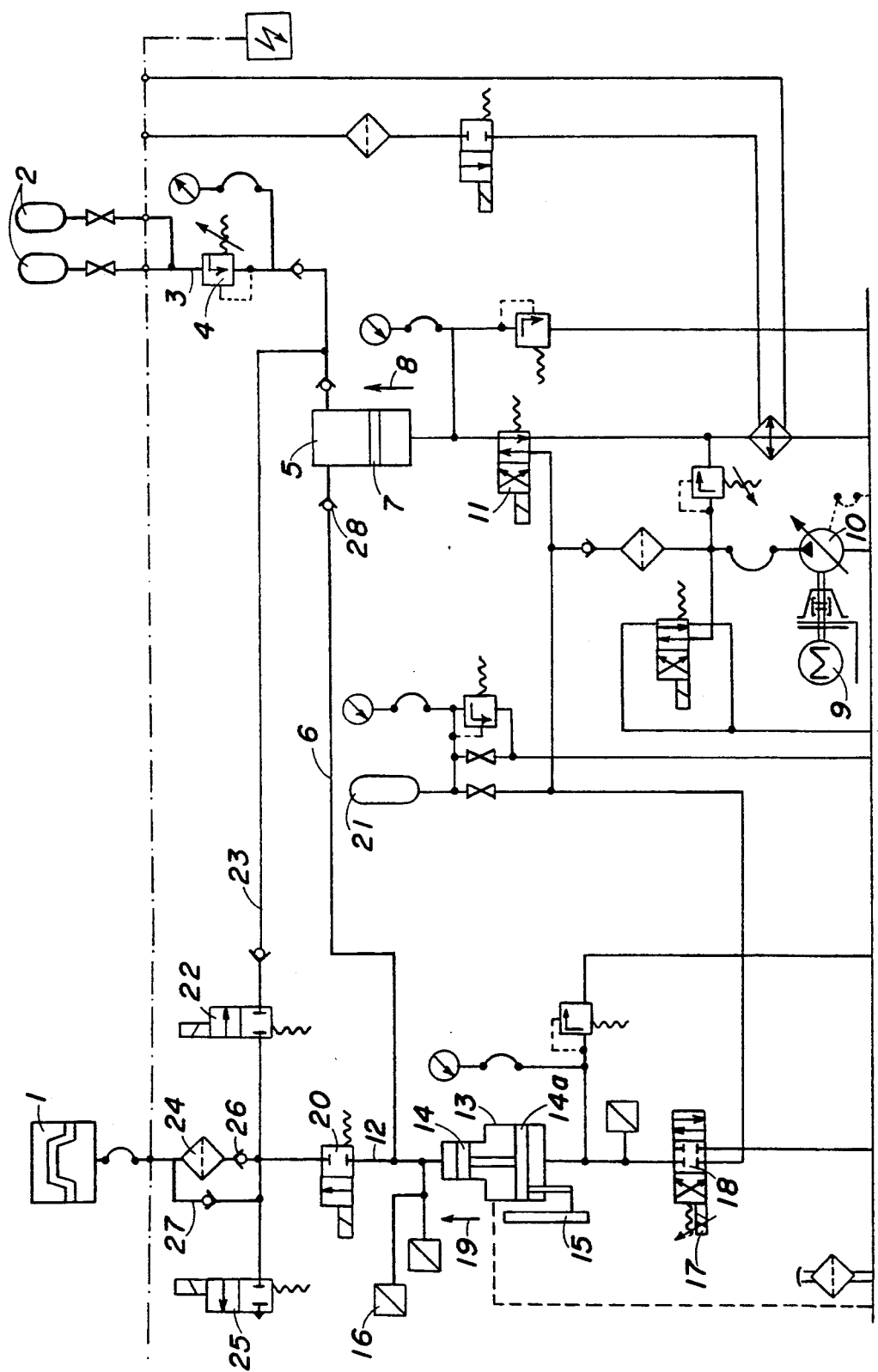

INJECTION MOLDING PROCESS WITH PRESSURE INCREASING MECHANISM

CROSS REFERENCE TO RELATED APPLICATION

This is a continuation-in-part application of Ser. No. 07/409,241 filed Sep. 19, 1989, which is now abandoned.

FIELD AND BACKGROUND OF THE INVENTION

The present invention relates in general to injection molding machines, and in particular to a new and useful injection molding machine having means for increasing the pressure of gas supplied to a mold of the machine.

Injection molding machines are known where, during injection of plastic into a mold ("the molding tool") or respectively after injection of the plastic and before the mold is opened, a gas, preferably nitrogen, is injected or blown into the mold. Since this gas is injected into the not yet hardened plastic, the gas forms a cavity in the molded piece, which leads to an often significant savings of material, in particular in the case of very voluminous pieces.

In such known devices, as described for instance in British patent document GB-A-2,139,548, exactly that quantity of gas that is intended to be forced into the mold is supplied to the piston reservoir. By displacement of the piston of the piston reservoir, this defined quality of gas is brought to the pressure at which the gas is to be introduced into the mold. As the quantities to be introduced depend entirely on what object is to be produced, and also the injection pressure of the gas varies within wide limits, for example between 40 and 200 bar, the starting position of the piston of the piston reservoir is different from case to case.

SUMMARY OF THE INVENTION

The present invention proceeds from the reasoning that a defined feed of the gas into the mold is much easier if the piston of the piston reservoir has a constant starting position which is independent of the gas quantity to be injected and the initial pressure thereof. To establish the desired initial pressure of the gas in the reservoir, the piston itself can no longer be used under this condition. The pressure at which the gas flows out of the storage vessel must, on the other hand, be reduced by a reducing valve much farther than the desired operating pressure range, as the storage vessel could otherwise be evacuated only to a small degree. To solve this problem, it is proposed, therefore, according to the invention, to interpose between the storage vessel or vessels and the piston reservoir a mechanism for increasing the gas pressure, this mechanism being preferably formed by a further piston reservoir.

A special advantage of the invention which appears independently of the solution to the initially posed problem, resides in that the further reservoir facilitates the recovery of additional recycled gas.

The storage vessel is generally a commercial compressed gas bottle, having for example, a volume of 50 liters at 200 bar. With many injection molding cycles per hour, the consumption of gas is considerable. This is reflected not only in the cost of the gas, but also in particular since the gas bottles must be changed relatively often, which in many cases means an interruption of the machine operating time, but in any case requires considerable additional work for the operators. Also it should be remembered that handling the heavy steel bottles is relatively cumbersome In GB-A-2,139,548 it has been proposed to return a part of the gas no longer needed after the hardening of the plastic, from the cavity of the produced object, into the storage vessel. This, however, works only as long as the pressure of the returned gas is higher than that in the storage vessel. This is why the mentioned proposal has no practical importance. But if, in further development of the invention, the discharge line is connected by means of a further line to the further reservoir, the recycling of the gas can take place without additional measures down to a gas pressure which corresponds to that at which the pressure reducing valve downstream of the storage vessel supplies fresh gas to the second reservoir. Only after falling below this pressure does it make sense to discharge residual gas into the atmosphere, to avoid having to make the second reservoir unnecessarily large.

Accordingly, an object of the present invention is to provide an apparatus for supplying a selected quality of gas to a mold in an injection molding machine, comprising stored gas supply means for supplying stored gas under pressure, a piston reservoir connected to the stored gas supply means for receiving a selected amount of gas and being activatable to supply the gas to the mold, drive means connected to the piston reservoir for activating the piston reservoir to supply the selected amount of gas to the mold, and gas pressure increasing means connected between the piston reservoir and the stored gas supply means for increasing the pressure of the selected amount of gas supplied to the piston reservoir.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

An embodiment of the invention is explained below with reference to the drawing wherein the only figure is a diagram of a gas supply apparatus for an injection molding machine according to the present invention.

DESCRIPTION OF THE PREFERRED EMBODIMENT

In the drawing, a mold 1 of an injection molding machine for the production of plastic articles is shown only schematically. The invention comprises a method and apparatus for supply gas into the mold, which includes a gas source or stored gas supply means for the mold. These means are formed by conventional steel bottles 2 each holding 50 liters of nitrogen at 200 bar.

From the steel bottles 2, the gas passes through a line 3, a pressure reducing valve 4 and a check valve, into a piston reservoir 5 which defines a first pressure increasing means. After passing through the pressure reducing valve 4, the gas has a pressure of about 5 bar. By using the reservoir 5 and the pressure reducing valve 4, it is possible to evacuate the steel bottles 2 forming the gas source, to a large extent.

In the embodiment illustrated, two steel bottles 2 are provided, so that exchanging an empty steel bottle will not lead to an interruption of the injection molding process. To feed the gas through a supply line 6, the gas is compressed by a piston 7 in the piston reservoir 5. The movement of piston 7 in the direction of arrow 8 is achieved by a hydropump 10 which is driven by an electric motor 9, the movement being controlled by a switch valve 11.

From the supply line 6, the gas passes into an outlet line 12 of a piston reservoir 13, through which the actual injection or blowing of the gas occurs. Outlet line 12 is connected between reservoir 13 and mold 1. Contained in the piston reservoir 13, which defines a second pressure increasing means, are two pistons 14 and 14a of different diameters which are connected to each other. The pistons 14 and 14a are connected to a displacement transducer 15. Reservoir 5 has a greater volume then reservoir 13. Further, a bubble reservoir 21 is provided which greatly accelerates the feed movement of the pistons 14, 14a which are driven by hydropump 10.

At the piston reservoir 13 and in line 12, is a gas pressure sensor 16, which controls the movement of piston 7 for obtaining a desired operating pressure or pressure profile in the gas chamber over piston 14 of the piston reservoir 13. Upon receiving a signal from the injection screw of the molding machine which is only shown schematically by an arrow in the switch 17 of a servo-valve 18, the slide of the servo-valve 18, constructed as a proportional valve, is opened via switch 17 and the pistons 14, 14a are displaced forwardly in the direction of arrow 19 by hydraulic pressure on piston 14a. The pressure comes from hydropump 10 which acts as drive means for both pressure increasing means 5 and 13. The nitrogen is injected into the closed mold 1 via a now open injection valve 20 in line 12 and an injection line 27, and the pressure in the molding tool is maintained for a predetermined time.

Pressure sensor 16 is also connected to the switch 17 of server valve 18, for controlling valve 18 to move the piston 14a, and its connected piston 14, so as to follow a selective pressure profile for gas being supplied under pressure to mold 1. For example, 140 bar gas pressure may be needed at the beginning when starting the blowing of gas into mold 1. The gas pressure may then need to increase in the mold to 400 bar. As the gas enters the melted plastic in the hot mold 1, the gas tends to expand and rebound back toward the reservoir 13 (second pressure increasing means) along the outlet line 12, through a check valve 26. To avoid overpressurizing the mold, sensor 16 senses this momentary pressure increase and controls switch 17 to slow the movement of piston 14, or in extreme cases, reverse the movement of piston 14 to maintain the desired pressure profile (whether it is a constant pressure, or increasing or decreasing pressure with time) in the mold 1.

During injection of the gas, a return valve 22 is closed. Valve 20 remains open however, so that the gas, warmed in the mold, can flow back from the molding tool 1 partly into the gas chamber of the piston reservoir 13. This equalizes the pressure in the second pressure increasing means (reservoir 13) and the mold 1 at a relatively high first recycled gas pressure (e.g. 130 bar). Equalization of gas is over line 12 and through the open injection valve 20.

After the plastic in mold 1 has solidated an the pressure has equalized so that no more gas can flow into the reservoir 13, valve 20 is closed and valve 22 is opened. Now gas flows via the return line 23 back into the piston reservoir 5, now serving as a collecting vessel, the return line 23 leading into initial gas line 3 downstream of the pressure reducing valve 4.

The backflowing gas passes through a filter 24 which prevents plastic particles from getting into the gas line system. Pressure is thus again equalized, this time at a second lower recycled gas pressure, between the first pressure increasing means (reservoir 5) and the mold 1, over line 23 and through the open valve 22.

Before valve 22 is open and recycled gas is supplied over return line 23, the pressure in reservoir 5 is about 10 to 15 bar. By opening valve 22, the pressure now available from mold 1 over lines 12 and 23 (about 130 bar) equalizes with the lower pressure in reservoir 5 so that the second lower recycled gas pressure is at about 50 to 60 bar. At this point, since again no more gas is available from mold 1 to reservoir 5, valve 22 is closed, and with valve 20 remaining closed, a vent valve 25 at an opposite end of line 23 is opened to release the remaining pressure (about 50 to 60 bar) to the atmosphere. This remaining pressure from mold 1 is lost.

At this point, the apparatus is ready for the next molding cycle. In preparation, valve 25 is closed, valve 22 remains closed and valve 20 is open to allow flow of gas over outlet line 12 from the two pressure increasing means 5 and 13, to the mold 1.

The illustrated apparatus permits the recycling of gas by means of the piston reservoir 13 in an exactly predetermined manner. For this reason it is essential that the pistons 14, 14a are in exactly defined starting positions independently of the particulars of the individual case. In this starting position, the gas chamber in front of the smaller piston 14 is filled by the piston reservoir 5 via a check valve 28 at a pressure exactly monitored by the sensor 16. Since the forward movement of the piston 14 is monitored by the displacement transducer 15 and it always starts from the same initial position, it is relatively easy to carry out the supply of gas to the molding tool 1 via the outlet 12 and a supply line 27 in a reproducible manner. Designing the piston reservoir 13 as a pressure transducer facilitates fine control and the arrangement of the bubble reservoir 21 connected to the hydraulic line of pump 10, reduces the inertia of the arrangement as far as possible.

The recovery of the gas purified by the filter 24, which gas passes through the discharge check valve 26, occurs at first into the gas chamber of the piston reservoir 13, which pushes the pistons 14, 14a back. Subsequently, due to the fact that at reduced pressure, the switching valve 20 is closed and the switching valve 22 to the piston reservoir 5 is open, reservoir 5 is also filled up, pushing the piston 7, back. Only residual gas of low pressure is thus discharged into the open atmosphere via vent valve 25.

The present invention thus is an apparatus for supplying a selected quality of gas to the mold 1 of an injection molding machine, comprising stored gas supply means 2 and 3 for supplying stored gas under pressure, a piston reservoir 13 connected to the supply means for receiving a selected amount of gas and being activatable for supplying the gas to the mold, drive piston 14a in the piston reservoir for activating the piston reservoir to supply the gas to the mold, and gas pressure increasing means 5 connected between the piston reservoir 13 and the supply means 2, 3 for increasing the pressure of the selected amount of gas supplied to the piston reservoir.

During gas pressure, equalization and recycling of gas into the reservoir 13 and into the reservoir 5, the pistons in each of these reservoirs are moved backwardly to accept gas from the mold 1. This prepares each of the pressure increasing means for a subsequent blowing cycle.

While a specific embodiment of the invention has been shown and described in detail to illustrate the application of the principles of the invention, it will be understood that the invention may be embodied otherwise without departing from such principles.

What is claimed is:

1. A method for supplying gas into melted plastic of a plastic article in a mold, and for saving energy and recycling at least some gas from the mold, comprising:
   supplying stored gas over a gas supply line to first pressure increasing means for increasing the pressure of gas in the gas supply line;
   providing second pressure increasing means for increasing the pressure of gas, and an outlet line which connects the second pressure increasing means to the mold;
   supplying the gas whose pressure has been increased by the first pressure increasing means along the gas supply line to the second pressure increasing means;
   operating the second pressure increasing means to supply gas at an operating pressure from the second pressure increasing means through an open injection valve in the outlet line, to the mold for injecting gas into melted plastic in the mold;
   maintaining the injection valve open as plastic in the mold hardens to form a plastic article in the mold, gas from the mold being recycled along the outlet line through the open injection valve to the second pressure increasing means until pressure in the mold and the second pressure increasing means has equalized at a first relatively high recycled gas pressure;
   closing the injection valve when the first recycled gas pressure has been reached and opening a return valve in a return line connected between the mold and the first pressure increasing means for recycling gas only from the mold to the first pressure increasing means for equalizing the pressure of gas in the mold and in the first pressure increasing means at a second recycled gas pressure which is lower than the first recycled gas pressure; and
   when the second recycled gas pressure has been reached in the return line, closing the return valve and, with the injection valve remaining closed, opening a vent valve which connects the outlet line to atmosphere, to vent remaining gas in the mold to the atmosphere whereby gas from the mold is recycled to the first and second pressure increasing means for saving energy and gas.

2. A method according to claim 1, including sensing the pressure of gas on the outlet line during operation of the second pressure increasing means for supplying gas under pressure along the outlet line to the mold, connecting the sensor means to means for operating the second pressure increasing means for operating the second pressure increasing means at a selected operating pressure profile for maintaining the operating pressure profile along the outlet line.

3. A method according to claim 2, wherein said first and second pressure increasing means comprise first and second reservoirs having respective first and second pistons movable therein, the method including moving the first and second pistons in the first and second reservoirs in a first direction for pressurizing gas, and in a second opposite direction for receiving the recycled gas.

4. A method according to claim 3, including supplying hydraulic fluid to the first and second reservoirs for moving the first and second pistons.

5. A method according to claim 4, including supplying gas to the first pressure increasing means from at least one gas supply bottle and through a pressure reducer connected between the bottle and the first pressure increasing means.

6. A method according to claim 1, wherein said first and second pressure increasing means comprise first and second reservoirs having respective first and second pistons therein, the method including moving the first and second pistons in the first and second reservoirs in a first direction for pressurizing gas, and in a second opposite direction for receiving the recycled gas.

7. A method according to claim 6, including supplying hydraulic fluid to the first and second reservoirs for moving the first and second pistons.

8. A method according to claim 1, including supplying gas to the first pressure increasing means from at least one gas supply bottle and through a pressure reducer connected between the bottle and the first pressure increasing means.

* * * * *